(12) United States Patent
Wüstefeld et al.

(10) Patent No.: US 7,116,799 B2
(45) Date of Patent: Oct. 3, 2006

(54) APPARATUS AND A METHOD FOR THE DETECTION OF OBJECTS

(75) Inventors: Martin Wüstefeld, Sexau (DE); Georg Plasberg, Bahlingen (DE)

(73) Assignee: Sick AG, Waldkirch (DE)

( * ) Notice: Subject to any disclaimer, the term of this patent is extended or adjusted under 35 U.S.C. 154(b) by 700 days.

(21) Appl. No.: 09/974,707

(22) Filed: Oct. 9, 2001

(65) Prior Publication Data

US 2002/0150278 A1    Oct. 17, 2002

(30) Foreign Application Priority Data

Oct. 10, 2000    (DE) ............................ 100 50 083

(51) Int. Cl.
*G06K 9/00* (2006.01)

(52) U.S. Cl. .................... 382/103; 348/143; 348/152

(58) Field of Classification Search ........ 382/103–108, 382/151, 159, 174, 236, 284, 294, 295; 348/143, 348/152, 154, 155, 169; 356/603–606
See application file for complete search history.

(56) References Cited

U.S. PATENT DOCUMENTS

| | | | | |
|---|---|---|---|---|
| 4,679,077 A | * | 7/1987 | Yuasa et al. ................. | 348/154 |
| 4,783,833 A | * | 11/1988 | Kawabata et al. .......... | 382/107 |
| 5,151,945 A | * | 9/1992 | Lee et al. .................... | 382/103 |
| 5,721,692 A | * | 2/1998 | Nagaya et al. .............. | 345/475 |
| 5,969,755 A | * | 10/1999 | Courtney .................... | 348/143 |
| 6,075,238 A | | 6/2000 | Fembök | |
| 6,088,468 A | * | 7/2000 | Ito et al. ...................... | 382/103 |
| 6,157,744 A | * | 12/2000 | Nagasaka et al. ........... | 382/236 |
| 6,167,167 A | * | 12/2000 | Matsugu et al. ............ | 382/283 |
| 6,285,787 B1 | * | 9/2001 | Kawachi et al. ............ | 382/209 |
| 6,295,367 B1 | * | 9/2001 | Crabtree et al. ............ | 382/103 |
| 6,297,844 B1 | * | 10/2001 | Schatz et al. ................ | 348/43 |
| 6,640,004 B1 | * | 10/2003 | Katayama et al. .......... | 382/154 |
| 6,754,367 B1 | * | 6/2004 | Ito et al. ...................... | 382/103 |

FOREIGN PATENT DOCUMENTS

| | | |
|---|---|---|
| DE | 3612653 C2 | 3/1988 |
| DE | 44 30 016 A1 | 2/1996 |
| DE | 198 09 210 A1 | 9/1999 |
| DE | 19809210 A1 | 9/1999 |
| EP | 0577491 B1 | 3/1999 |

OTHER PUBLICATIONS

C.J. Munno, H. Turk, J.L. Wayman, J.M. Libert, T.J. Tsao; "Automatic Video Image Moving Target Detection for Wide Area Surveillance"; IEEE; 1993.*

Matz, R. Der Einsatz schneller Beleuchtungsoperationen für die robuste Merkmalsextraktion un Segmentierung in der industriellen Objekterkennung und Qualitätsprüfung, *Musterekennung*, 1988, 10. DAGM-Symposium, Zürich, Sep. 1988, Springer-Verlag, p. 270-276.

* cited by examiner

*Primary Examiner*—Bhavesh Mehta
*Assistant Examiner*—Craig W. Kronenthal
(74) *Attorney, Agent, or Firm*—Townsend and Townsend and Crew LLP

(57) ABSTRACT

The invention relates to an apparatus and a method for the detection of an object moving in the monitored region of a camera, wherein measured values are compared with reference values and an object detection reaction is triggered when the measured value deviates in a predetermined manner from the reference value. In this respect, both the measured values and the reference values are derived from differences which exist between at least two different image regions.

17 Claims, 4 Drawing Sheets

APPARATUS AND A METHOD FOR THE DETECTION OF OBJECTS

BACKGROUND OF THE INVENTION

The invention relates to an apparatus and a method for the detection of an object moving in the monitoring range of a camera.

A reference image with an object-free monitored region is usually recorded and stored with such methods or apparatuses. Images of the monitored region are then continuously recorded and compared with the stored reference image during the actually occurring monitoring. If deviations result here, the presence of an object is assumed and a corresponding reaction triggered, for example a switching off of a machine. The comparison of the recorded images with the stored reference image takes place, for example, in such a way that the brightness of pixels of the reference image and of the actually recorded image which mutually correspond with respect to their spatial position are compared to one another and then a reaction is triggered if the determined brightness of a specific number of pixels of the actually recorded image does not agree with the corresponding brightness values of the pixels of the reference image.

A problem in the use of known apparatuses and known methods of this kind is the fact that the camera and/or parts of the monitored region can move, for example as a consequence of permissible vibrations or oscillations, which can then result in changes in the images recorded and, with an object-free monitored region, in an unwanted triggering of reactions. Being more specific, it is for example possible for a hazardous region of a machine to be monitored using the camera with the intention being to switch off the machine whenever a person moves into the monitored region. Such a person causes brightness differences in the images recorded during the monitoring with respect to an object-free reference image so that when persons intrude into the monitored region, a stopping of the machine can take place in a desired manner. If, however, a vehicle now drives past the monitored machine, for example, and produces vibrations which move either the camera or the machine slightly, an—unwanted—stopping of the machine will also take place in this case due to the differences between the images recorded and the reference image, even though no person is located in the monitored region.

SUMMARY OF THE INVENTION

An object of the invention is to further develop a method or an apparatus of the kind initially mentioned such that, on the one hand, an unintentional triggering of reactions is prevented and such that, on the other hand, it is ensured at the same time that the reliable triggering of a reaction is guaranteed on the intrusion of objects or persons into the monitored region.

This object is satisfied in accordance with the method of the invention by an actual image of the monitored region being recorded by the camera;

at least one actual measured value being derived from the actually recorded image which provides information on differences between at least two different image regions and which is invariant with respect to image displacements, image rotations and/or image size changes;

the actual measured value being compared with a corresponding stored reference value derived from a reference image recorded by the camera; and an object recognition reaction being triggered on a pre-set deviation of the actual measured value from the reference value.

This object is satisfied in accordance with the apparatus of the invention by a camera for the recording of an image of the monitored region;

a device for the derivation of at least one actual measured value from the actually recorded image, with the measured value supplying information on differences between at least two different image regions and being invariant with respect to image displacements, image rotations and/or image size changes;

a comparison device for the comparison of this actual measured value with a corresponding reference value derived from a stored reference image recorded by the camera; and an object recognition stage for the triggering of an object recognition reaction on the finding of a pre-set deviation of the actual measured value from the reference value.

In accordance with the invention, therefore, each pixel of a recorded image is not compared to the corresponding pixel of the reference image as in the prior art, but instead reference values or measured values are determined both from the reference image and from the actually recorded images which only supply information on differences between different regions of the respective images. Only relative information relating to a reference image or an actually recorded image is therefore examined in each case and not absolute information such as the brightness of a specific pixel as in the prior art. This relative information of an actually recorded image determined in accordance with the invention is then compared with the corresponding relative information of the reference image. Only when sufficiently large differences are found is a reaction triggered. The relative information has the advantage with respect to absolute information that it can be invariant with respect to image displacements, image rotations and/or image size changes so that, for example, vibrations of the camera or of the monitored region do not result in a change in the relative information or of the determined measured value.

A structure is preferably superimposed on the reference image and the actually recorded image which is an element of the image. The reference values and the measured values are then gained from the corresponding structure information.

The object-free monitored region can, for example, be provided with a grid structure which is then recognized as structure information, whereupon, for example, the mutual spacings of different grid lines are determined as the reference values or measured values in accordance with the invention. Such measured values and reference values, shown here only by way of example, are invariant with respect to image displacements and image rotations in accordance with the invention, which has the consequence that these measured values do not change, if the monitoring camera is, for example, set into vibration. Since the measured values therefore do not change with respect to the reference values in such a case in which only the camera was set into vibration and no object is present in the monitored region, a reaction is accordingly not triggered either in the desired manner. If, however, an object moves into the monitoring region, this object will either cover a grid structure fixedly secured in the monitoring range or the grid lines of a grid structure projected into the monitored region will be displaced by different amounts. In each case this then results in a change in the measured values that are determined and accordingly also in a desired triggering of a reaction, for example a switching off of a machine.

As already mentioned, the structure in the monitored region can be generated during the recording of the reference image and of the actual images of the monitored region by means of a projection device; equally, however, the structure can also be generated by means of a moved light beam, for example of a laser beam. This has the advantage that the monitored region does not need to be manipulated in any way, for example by gluing on a structure foil.

It is furthermore of advantage if—simultaneously or in time sequence—mutually different structures are generated in the monitored region since then the method of the invention can be carried out with respect to each individual structure, which reduces the risk of erroneous reactions being triggered or of reactions being erroneously omitted. In this respect, different projection directions or different devices for the generation of the moved light beam can be used for the generation of the different structures; equally, however, it is also possible to generate different structures by means of a single device.

In accordance with the invention, a reaction is preferably only triggered when the comparison of the actual measured value with the reference value provides a comparison value which lies outside a pre-set tolerance range. This additionally reduces the risk for erroneous triggerings since differences between the measured value and the reference value lying within the tolerance range do not trigger any reactions.

It is of advantage if the image information or structure information comprise, among other things, information with relation to the reference points, with the reference points in particular marking the boundaries of the monitored region. These reference points facilitate the locating of the structure information and reduce the complexity of the required image recognition algorithms. Reflections can be used for the marking of the reference points which are arranged at invariant positions relative to the monitored region and, for example, mark the edge of the monitored region.

It is particularly preferred if a plurality of actual measured values of the same or of different type are derived from the actual image information or structure information and is compared with corresponding stored reference values derived from the image information or structure information of the reference image. The risk of erroneous reactions or erroneously omitted reactions can additionally be reduced by the use of a plurality of measured values.

The measured values and/or the reference values can preferably include one or more of the pieces of the information given below:

- distance between two different image regions or structure regions or between a reference point and an image region or a structure region;
- brightness difference between two different image regions or structure regions or between a reference point and an image region or a structure region;
- color difference between two different image regions or structure regions or between a reference point and an image region or a structure region;
- brightness gradient between two different image regions or structure regions or between a reference point and an image region or a structure region.

All the above-named information has the common feature that it only represents relative information and not absolute information.

It is of advantage if, alternatively or additionally, a correlation function is calculated between at least one region of the actual image information or structure information and a corresponding region of the image information or structure information of the reference image and if the shape of the correlation function and/or certain values of this correlation function are used for the decision with respect to the triggering of an object recognition reaction. This variant makes use of the advantage that a correlation function also ultimately only represents relative information which is not influenced, for example, by displacements or rotations of image regions.

The monitored region is preferably illuminated by means of at least one light source during the recording of the reference image and of the actual images of the monitored region. This allows the camera to detect further processable images without problem.

The working order of the camera used can be checked by recording images regularly with and without a structure generated in the monitored region and subsequently checking whether the structure information is found when a structure is generated and is not found when a structure is not generated. In this respect, mutually different structures can preferably be used for the checking of the camera which are generated in the monitoring range simultaneously or in time sequence. The checking of the camera must be carried out in this alternative at a point in time at which no monitoring function takes place or at which the monitoring function can be briefly interrupted.

It is alternatively possible, both in the recording of reference images and in the recording of actual images to take always one image with a generated structure and one image with no structure generated in each shot and subsequently to process only the difference image resulting from these two images. In this case, an "object recognition reaction" is always triggered when a deviation results between the reference difference image and an actually recorded difference image. This deviation is then explained either by the presence of an object in the monitored region or by faulty operation of the camera so that, for example, a switching off of a machine can be ensured in the two hazard cases of an object in the monitored region or of faulty operation of the camera.

The invention is described in the following by way of embodiments and with reference to the drawings.

DESCRIPTION OF THE PREFERRED EMBODIMENTS

Figure 1:
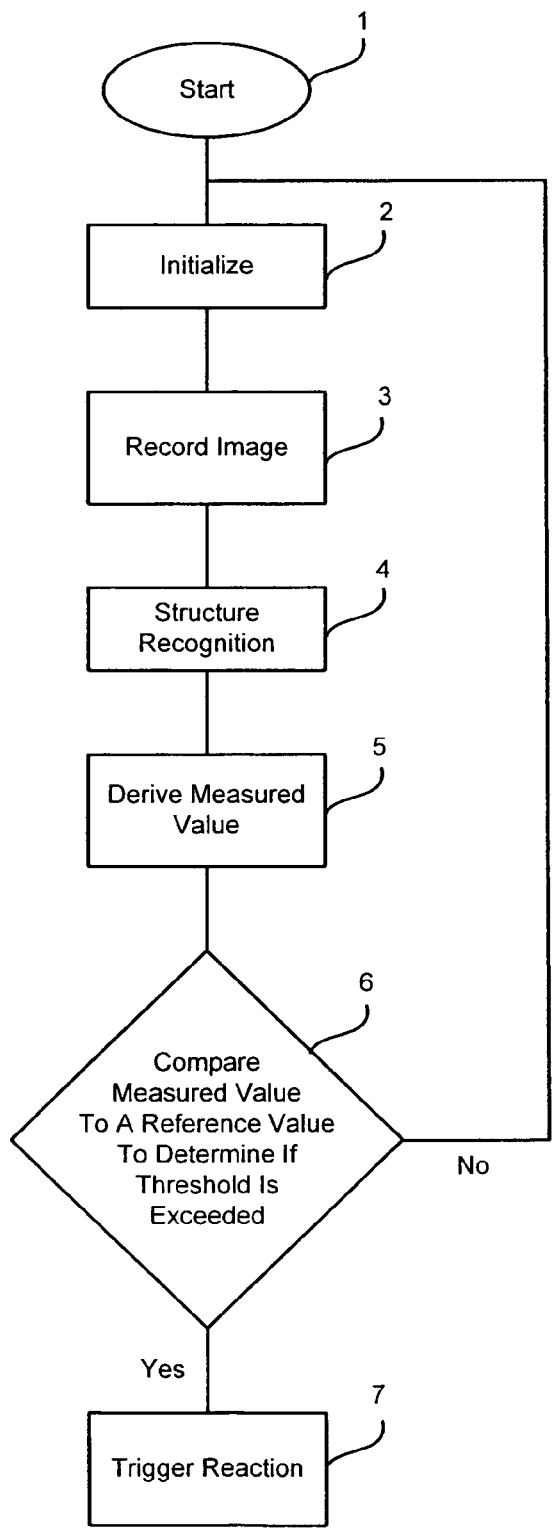
FIG. 1 is a flowchart of the routines of the method of the invention for the detection of an object moving in the monitored region of a camera.

A flowchart is shown in FIG. 1 which illustrates the individual method steps which are carried out in the method of the invention for the detection of an object moving in the monitored region of a camera.

The initial or starting point of the method is designated with 1.

At the start an initialization of the total system is made in step 2, which comprises the resetting of variables to their start values, the emptying of memories in an evaluation unit and putting the camera into a state ready for recording, etc. This is not explained in further detail at this point since such initialization procedures are state of the art and a matter of course for one skilled in the art.

At step 3, an actual image of a monitored region is recorded with a camera, which means that a virtual image consisting of pixels of the monitored region is generated by any desired image sensor and that the image is electronically stored in an image memory. In the simplest case, the pixels can be represented in binary manner, that is, black or white, have different gray stages or have colors with different color gradations.

Structure recognition is carried out in step 4 by a recognition device of the evaluation unit. The recognition device uses an algorithm for this purpose which is able to recognize structures such as line regions, grid regions or areal regions from the image stored in an image memory, that is, to make a mathematical correlation between pixels which represent an object or a part of an object.

At step 5, a derivation device of the evaluation unit can derive a measured value from such a structure which does not change, for example, with a pre-set, permitted displacement or rotation of the structure. With structure information including a grid structure, such a measured value can comprise the spacing of adjacent grid lines, the angle at which the grid lines intersect, the area enclosed by specific grid lines, etc. If the structure information comprises, for example, an area or an areal segment, the measured value can, for example, be equal to the surface integral.

At step 6, the determined measured value is then compared by a comparator with a reference value calculated from a corresponding structure of a reference image, the reference value being determined in the same way as the actual measured values and being derived from an image of an object-free monitored region. If the comparison of the measured value with the reference value results in the measured value exceeding a defined measure, that is, a threshold value, it is branched to step 7 where a reaction triggering device of the evaluation unit triggers a pre-defined reaction such as the emission of an alarm signal or the switching off of a machine. If the comparison result does not exceed the threshold value, the routine returns to step 3 and a new image of the monitored region is recorded. The method described subsequently runs again from the start.

Figure 2:
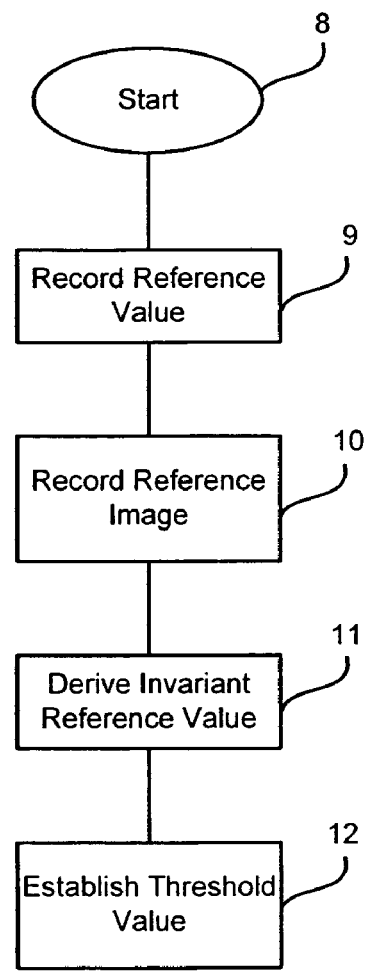
FIG. 2 is a flow diagram of the routines in the determination of the reference value made use of in accordance with the invention.

FIG. 2 illustrates the routines in the determination of the reference value used for the determination in accordance with the invention. After the start at 8, a reference image of the monitored region is first recorded by means of the camera at step 9 without an object not belonging to the allowed or permitted scene being in the monitored region.

Subsequently to this, at step 10, as described for step 3 at FIG. 1, a structure is recognized in the image supplied by the camera and stored in the image memory.

At step 11, the evaluation unit derives a value from the recognized structure which is invariant with respect to predetermined image changes explained in connection with step 4 (FIG. 1) and stores this as the reference value.

Furthermore, at step 12, a threshold value is determined which represents a maximum permitted deviation in magnitude between an actual measured value determined at a later point in time and the reference value, without a reaction having to be triggered by the evaluation unit.

The method of FIG. 2 will usually run as part of step 2 in accordance with FIG. 1.

Figure 3:
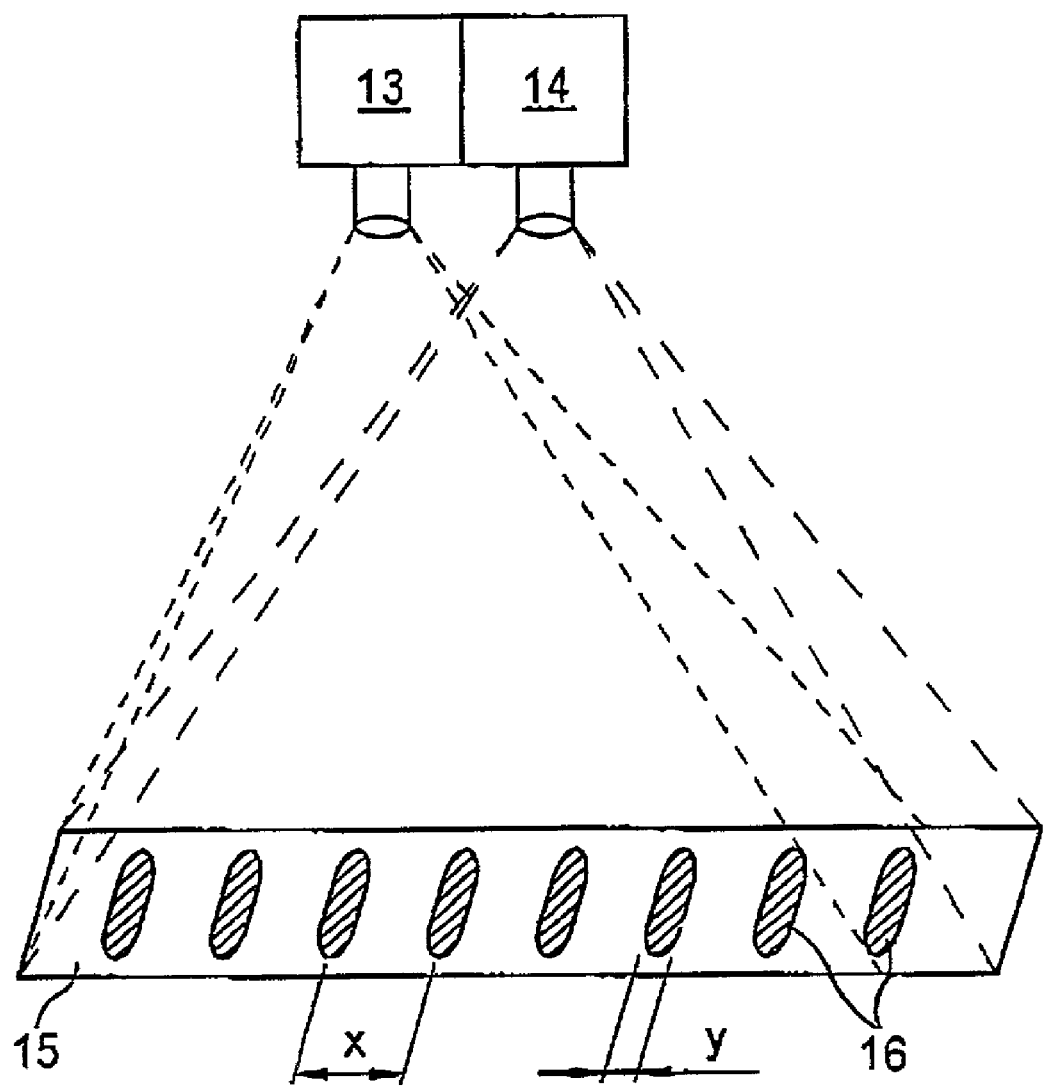
FIG. 3 is the schematic illustration of an apparatus made in accordance with the invention for the carrying out of the method of the invention.

FIG. 3 shows, in a schematic representation, a camera 13 and an illumination and projection device 14 which are both arranged in a common housing and whose lenses are directed to a monitored region 15. The fields of view of the lenses of the camera 13 and of the illumination and projection device 14 mutually overlap such that at least substantially the same section of the monitored region 15 is detected by both devices. The monitored region 15 can, for example, represent the boundaries of a hazardous region in front of a machine.

The illumination and projection device 14 projects a structure of dark elements 16 located on a light background onto the monitored region 15. The camera 13 detects an image of the monitored region 15 with a structure projected thereon and supplies corresponding image information to an evaluation unit (not shown). This evaluation unit then determines structure information corresponding to the projected structure from this image information, whereupon the measured values x and y shown in FIG. 3, for example, can be determined from this structure information. The measured values x and y both represent relative information which in each case does not relate to the absolute brightness of pixels of the image recorded, but represents only information which relates to differences between different image regions. The measured value x, for example, thus represents the mutual spacing of two dark structure regions. The measured value y represents the width of a dark structure region. The two measured values x and y are here only mentioned by way of example; any further measured values such as color differences, distances to reference points, brightness differences, etc., can also be derived from the structure information of FIG. 3.

Figure 4A:
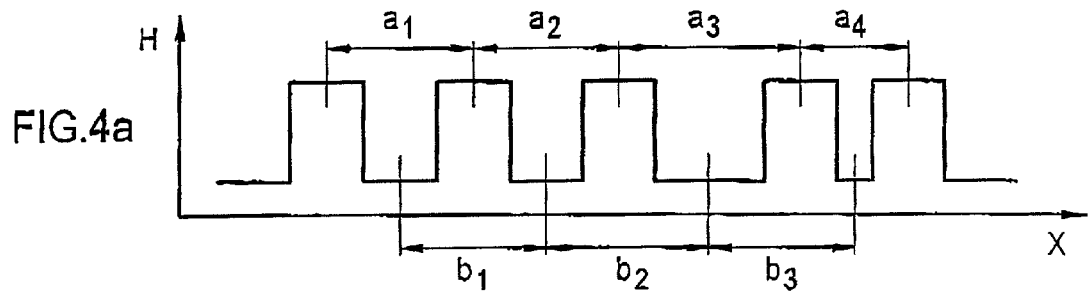
FIGS. 4a–c show different shapes of structure information which are gained from actually recorded images and from which measured values in accordance with the invention can be derived.
Figure 4B:
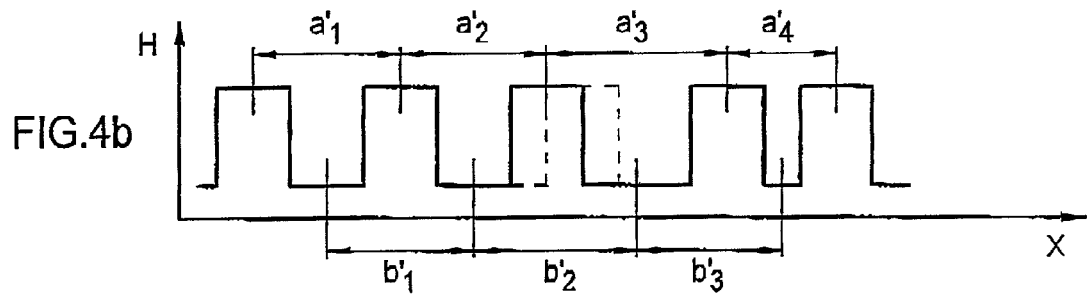
Figure 4C:
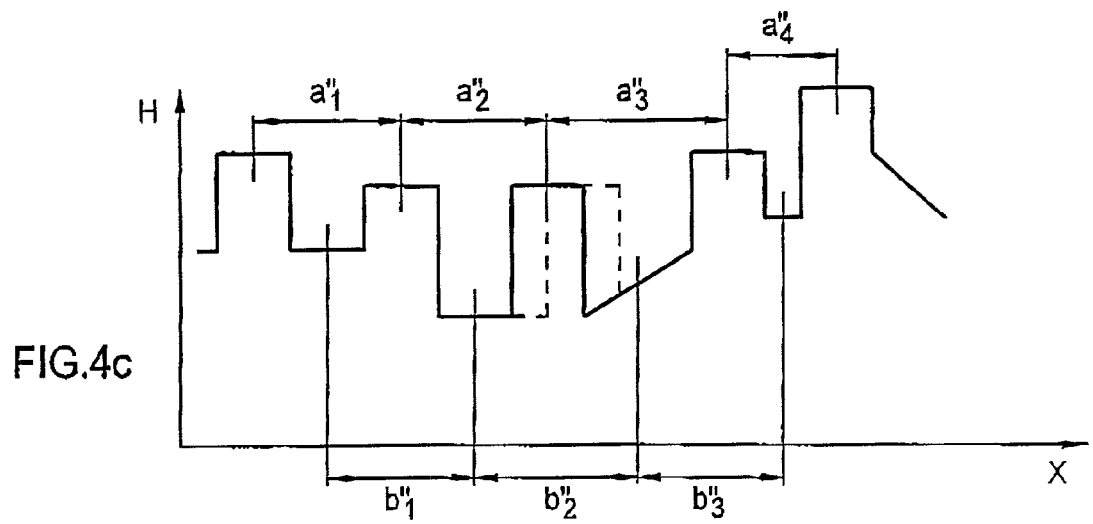

FIGS. 4*a–c* show one-dimensional brightness plots, entered over the position x of a dimension of a reference image selected as an example and of actually recorded images with measured values derived therefrom. However, measured values can likewise be derived from two- or three-dimensional image information within the framework of the invention.

In this respect, the brightness plot along a line of a reference image is shown in FIG. 4*a*. The reference image is recorded with an object-free monitored region and shows a structure with five bright regions located at mutually different distances which are each mutually bounded by dark regions. The reference values $a_1$ to $a_4$ determined from the reference image relate to the mutual spacings of adjacent bright structure regions, whereas the reference values $b_1$ to $b_3$ represent the spacings of mutually adjacent dark structure regions.

The reference values $a_1$ to $a_4$ and $b_1$ to $b_3$ are stored by an evaluation unit in order to be able to be successfully compared with actually determined measured values in monitoring operation.

FIG. 4*b* shows the brightness shape along a line of an image actually recorded during the monitoring operation, with a—permitted—displacement having taken place between the camera 13 and the monitored region 15 (see FIG. 3) during the recording of this actual image. This displacement results in the fact that the total image recorded was likewise recorded in displaced manner, which accordingly results in a displacement of the total brightness shape in accordance with FIG. 4*b* with respect to FIG. 4*a*. In this respect, however, all bright and dark regions are displaced in the same manner so that the actual measured values $a'_1$–$a'_4$ and $b'_1$ to $b'_3$ determined in accordance with FIG. 4b each remain unchanged with respect to the reference values $a_1$ to $a'_4$ and $b_1$ to $b_3$ determined in accordance with FIG. 4a. Since no deviation can thus be found between the measured values and the reference values, no reaction is triggered either.

However, if an unpermitted object is now moved into the monitored region, it is possible that the projection location of a bright region is displaced, which is illustrated by way of example in FIG. 4 by a dashed line. This displacement then results in a change in the measured values $a'_2$, $a'_3$, $b'_1$ and $b'_3$. These actual measured values then no longer correspond to the reference values associated with them so that a reaction is triggered in a desired manner.

FIGS. 4a and 4b thus show that a displacement between the camera and the monitored region does not on the whole result in a reaction triggering, but that a reaction is only triggered when an unpermitted object is actually present in the monitored region. The same applies accordingly when a variable interference light level is superimposed on the actually recorded image, as is shown by way of example in FIG. 4c.

It can be seen from FIG. 4c that the distances and widths of the bright and dark structure regions do not change with respect to FIG. 4b if a variable interference signal is superimposed on the actually recorded image. The sum signal of wanted signal to unwanted signal represented in FIG. 4c also allows the distances between the bright regions and between the dark region to be determined without problem and accordingly allows the measured values to be calculated. These measured values $a'''_1$ to $a'''_4$ and $b'''_1$ to $b'''_3$ are identical to the measured values of FIG. 4b so that no reaction is triggered with the plot shown in FIG. 4c either.

If, however, a displacement of the central brightness region (which is in turn shown by a broken line in FIG. 4c) occurs as a consequence of an object intruding into the monitored region, then the measured values change as well, as was described in connection with FIG. 4b. Accordingly, a reaction is then also triggered.

The use of the distances between bright regions and dark regions is in turn only shown by way of example in FIG. 4; any other measured values can likewise be derived from relative information between different image regions so that the advantages of the invention can also be achieved with these other measured values.

The invention claimed is:

1. A method for the detection of an object moving in the monitored region of a camera, wherein
    an actual image of the monitored region is recorded by the camera;
    at least one actual measured value is derived from the actually recorded image which provides information on differences between at least two different image regions and which is invariant with respect to image displacements, image rotations and/or image size changes;
    this actual measured value is compared with a corresponding reference value derived from a stored reference image recorded by the camera;
    an object recognition reaction is triggered on a pre-set deviation of the actual measured value from the reference value;
    a structure, which is a component of the image, is superimposed on the reference image and the actually recorded image, the reference value and a measured value being gained from the corresponding structure information; and
    a check is made whether the camera is in working order by recording images regularly with and without a structure generated in the monitored region and by checking whether the structure information is found with a generated structure and is not found with no structure generated.

2. A method in accordance with claim 1, characterized in that the structure in the monitored region is generated during the recording of the reference image and of the actual images of the monitored region by means of a projection device and/or by means of a moved light beam.

3. A method in accordance with claim 1, characterized in that mutually different structures are generated in the monitored region simultaneously or in time sequence.

4. A method in accordance with claim 3, characterized in that different projection devices are used for the generation of the different structures.

5. A method in accordance with claim 1, characterized in that an image of an object-free monitored region is used as the reference image.

6. A method in accordance with claim 1, characterized in that a reaction is triggered when the comparison of the actual measured value with the reference value provides a comparison value which lies outside a pre-set tolerance range.

7. A method in accordance with claim 1, characterized in that the image information or structure information comprises, among other things, information related to reference points, with the reference points in particular marking the boundaries of the monitored region.

8. A method in accordance with claim 7, characterized in that reflectors are used for the marking of the reference points and are arranged at invariant positions relative to the monitored region.

9. A method in accordance with claim 1, characterized in that a plurality of actual measured values of the same or of a different type is derived from the actual image information or structure information and is compared with corresponding stored reference values derived from the image information or the structure information of the reference image.

10. A method in accordance with claim 1, characterized in that the measured value(s) or reference value(s) include one or more pieces of the following information:
    distance between two different image regions or structure regions or between a reference point and an image region or a structure region;
    brightness difference between two different image regions or structure regions or between a reference point and an image region or a structure region;
    color difference between two different image regions or structure regions or between a reference point and an image region or a structure region;
    brightness gradient between two different image regions or structure regions or between a reference point and an image region or a structure region.

11. A method in accordance with claim 1, characterized in that a correlation function is calculated between at least one region of the actual image information or structure information and a corresponding region of the image information or of the structure information of the reference image, and the shape of this correlation function and/or determined values of this correlation function are used for the decision with respect to the triggering of an object recognition reaction.

12. A method in accordance with claim 1, characterized in that the monitored region is illuminated by means of at least one light source during the recording of the reference image and of the actual images of the monitored region.

13. A method for the detection of an object moving in the monitored region of a camera, wherein
an actual image of the monitored region is recorded by the camera;
at least one actual measured value is derived from the actually recorded image which provides information on differences between at least two different image regions and which is invariant with respect to image displacements, image rotations and/or image size changes;
this actual measured value is compared with a corresponding reference value derived from a stored reference image recorded by the camera;
an object recognition reaction is triggered on a pre-set deviation of the actual measured value from the reference value; and
one image is always recorded per shot with a generated structure and one with no structure generated, both in the recording of reference images and in the recording of actual images, and subsequently only the difference image from these two images is further processed.

14. A method in accordance with claim 13, characterized in that a structure, which is a component of the image, is superimposed on the reference image and the actually recorded image; and in that the reference value and a measured value are gained from the corresponding structure information.

15. A method in accordance with claim 13, characterized in that a check is made whether the camera is in working order by recording images regularly with and without a structure generated in the monitored region and by checking whether the structure information is found with a generated structure and is not found with no structure generated.

16. A method in accordance with claim 15, characterized in that mutually different structures, which are generated simultaneously or in time sequence in the monitored region, are used for the checking of the camera.

17. A method in accordance with claim 13, characterized in that an objection recognition reaction or a malfunction reaction is always triggered when a difference results between the reference difference image and an actually recorded difference image.

* * * * *